United States Patent
Takaguchi et al.

(10) Patent No.: US 6,852,368 B2
(45) Date of Patent: Feb. 8, 2005

(54) HARD COATING COMPOSITION AND RESIN PRODUCT WITH HARD COAT

(75) Inventors: Masayuki Takaguchi, Ichihara (JP); Fujio Sawaragi, Ichihara (JP)

(73) Assignee: Nippon Arc Co., Ltd., Chiba (JP)

( * ) Notice: Subject to any disclaimer, the term of this patent is extended or adjusted under 35 U.S.C. 154(b) by 0 days.

(21) Appl. No.: 10/311,252

(22) PCT Filed: Apr. 12, 2002

(86) PCT No.: PCT/JP02/03666
§ 371 (c)(1),
(2), (4) Date: Dec. 13, 2002

(87) PCT Pub. No.: WO02/088268
PCT Pub. Date: Nov. 7, 2002

(65) Prior Publication Data
US 2003/0194571 A1 Oct. 16, 2003

(30) Foreign Application Priority Data
Apr. 17, 2001 (JP) ........................................ 2001-117648

(51) Int. Cl.⁷ ................................................ B05D 3/02
(52) U.S. Cl. .................. 427/387; 428/447; 106/287.13; 106/287.16; 528/42; 528/39; 524/858
(58) Field of Search ................................ 428/447, 446; 524/858, 492, 493; 528/42, 39; 427/387; 106/287.13, 287.16

(56) References Cited

U.S. PATENT DOCUMENTS

| | | | | |
|---|---|---|---|---|
| 5,683,804 A | * | 11/1997 | Nagashima et al. | 428/336 |
| 6,149,979 A | * | 11/2000 | Kushibiki et al. | 427/387 |
| 6,265,061 B1 | * | 7/2001 | Kang et al. | 428/323 |
| 6,506,496 B1 | * | 1/2003 | Frugier et al. | 428/447 |

FOREIGN PATENT DOCUMENTS

| | | |
|---|---|---|
| EP | 1 070 750 | 1/2001 |
| JP | 7-233271 | 9/1995 |
| JP | 8-238683 | 9/1996 |
| JP | 8-309790 | 11/1996 |
| JP | 10-245521 | 9/1998 |
| JP | 2000-136350 | 5/2000 |
| JP | 2001-47584 | 2/2001 |
| WO | 99/57375 | 11/1999 |

* cited by examiner

*Primary Examiner*—Margaret G. Moore
*Assistant Examiner*—Marc S. Zimmer
(74) *Attorney, Agent, or Firm*—Wenderoth, Lind & Ponack, L.L.P.

(57) ABSTRACT

A resin substrate having a hard coat formed from a hard coat composition which comprises colloidal silica, a silicon compound having a fluoroalkyl group and optionally an ultraviolet light absorbing organic group. This resin substrate can retain water-repellency even when it is used in the open air and prevent the adhesion of a stain while it keeps its abrasion resistance for a long time by the hard coat composition.

7 Claims, No Drawings

HARD COATING COMPOSITION AND RESIN PRODUCT WITH HARD COAT

FIELD OF THE INVENTION

The present invention relates to a hard coat composition and a resin product having a hard coat therefrom. More specifically, it relates to a hard coat composition which provides a hard coat having weatherability, abrasion resistance and water repellency and to a resin product having this hard coat.

DESCRIPTION OF THE PRIOR ART

It has been known that a coating film of an acrylic composition comprising a polyfunctional acryl as the main component or a silicon-based composition comprising a polysiloxane as the main component is formed on the surface of a resin substrate to obtain a resin product having a water-repellent surface.

However, a coating film comprising an organic resin as a binder cannot retain sufficient water-repellency after exposure to ultraviolet radiation and is not satisfactory in terms of abrasion resistance. Further, a coating film made from only a silicon-based composition cannot avoid reductions in light transmission and brightness because a water drop containing a contaminant is readily adhered to the surface of the film when it is used in the open air. Further, water-repellency is maintained for only a few months when it is used in the open air.

JP-A 2000-136350 (the term "JP-A" as used herein means an "unexamined published Japanese patent application") discloses a hard coat composition having water-repellency which comprises an alkyltrialkoxysilane, tetraalkoxysilane and fluoroalkyltrimethoxysilane. This hard coat composition is unsatisfactory in terms of keeping stability as it causes a problem such as a rise in viscosity due to the reaction of the tetraalkoxysilane during storage. This composition greatly shrinks when it is cured, thereby making it difficult to prevent cracking at the time of curing.

SUMMARY OF THE INVENTION

It is an object of the present invention to provide a hard coat composition to give a hard coat which can retain water-repellency even when it is used in the open air and prevent the adhesion of a stain while it keeps its abrasion resistance for a long time.

It is another object of the present invention to provide a hard coat composition which can provide a hard coat having excellent weatherability in addition to the above advantages.

It is still another object of the present invention to provide a resin product having the above hard coat.

Other objects and advantages of the present invention will become apparent from the following description.

According to the present invention, firstly, the above objects and advantages of the present invention are attained by a hard coat composition (may be referred to as "first hard coat composition" hereinafter) comprising:
  colloidal silica;
  a compound represented by the following formula (1):

$$R^1_a R^2_b Si(OR^3)_{4-a-b} \tag{1}$$

wherein $R^1$ is an alkyl group having 1 to 4 carbon atoms, chloroalkyl group having 1 to 4 carbon atoms, aryl group having 6 to 12 carbon atoms, haloaryl group having 6 to 12 carbon atoms, methacryloxyalkyl group having 5 to 8 carbon atoms, ureidoalkylene group having 2 to 10 carbon atoms, aromatic ureidoalkylene group having 8 to 24 carbon atoms, aromatic alkylene group having 8 to 24 carbon atoms or mercaptoalkylene group having 1 to 12 carbon atoms, $R^2$ is an alkyl group having 1 to 6 carbon atoms, aryl group having 6 to 12 carbon atoms, alkenyl group having 2 to 10 carbon atoms, chloroalkyl group having 1 to 4 carbon atoms or haloaryl group having 6 to 12 carbon atoms, $R^3$ is a hydrogen atom, alkyl group having 1 to 4 carbon atoms, acyl group having 1 to 6 carbon atoms or alkylacyl group having 3 to 12 carbon atoms, a is 1, 2 or 3, and b is 0, 1 or 2, with the proviso that (a+b) is 1, 2 or 3; and
  a compound represented by the following formula (2):

$$R^4_c R^5_d Si(OR^6)_{4-c-d} \tag{2}$$

wherein $R^4$ is a fluoroalkyl group having 1 to 12 carbon atoms, $R^5$ is alkyl group having 1 to 6 carbon atoms, aryl group having 6 to 12 carbon atoms, alkenyl group having 2 to 10 carbon atoms, haloalkyl group having 1 to 6 carbon atoms or haloaryl group having 6 to 12 carbon atoms, $R^6$ is a hydrogen atom, alkyl group having 1 to 4 carbon atoms, acyl group having 1 to 6 carbon atoms or alkylacyl group having 3 to 12 carbon atoms, c is 1, 2 or 3, and d is 0, 1 or 2, with the proviso that (c+d) is 1, 2 or 3.

According to the present invention, secondly, the above objects and advantages of the present invention are attained by a hard coat composition (may be referred to as "second hard coat composition" hereinafter) comprising:
  colloidal silica;
  a compound represented by the above formula (1);
  a compound represented by the above formula (2); and
  a compound represented by the following formula (3):

$$R^7-X_g-R^8_h-Si(OR^9)_3 \tag{3}$$

wherein $R^7$ is an ultraviolet light absorbing organic group having a hydroxy group, $R^8$ is an alkyl group having 1 to 4 carbon atoms or acyl group having 1 to 6 carbon atoms, $R^9$ is a hydrogen atom, alkyl group having 1 to 4 carbon atoms or acyl group having 1 to 6 carbon atoms, X is an ether bond, ester bond or urethane bond, g is 0 or 1, and h is 0 or 1.

According to the present invention, thirdly, the above objects and advantages of the present invention are attained by a resin product (may be referred to as "first resin product" hereinafter) comprising a resin substrate, a primer layer and a hard coat layer made from the above first hard coat composition of the present invention in the mentioned order.

According to the present invention, in the fourth place, the above objects and advantages of the present invention are attained by a resin product (may be referred to as "second resin product" hereinafter) comprising a resin substrate and a hard coat layer made from the above second hard coat composition of the present invention.

THE PREFERRED EMBODIMENT OF THE INVENTION

A description is first given of the first hard coat composition of the present invention. The first hard coat composition comprises colloidal silica, a compound represented by the above formula (1) and a compound represented by the above formula (2).

The colloidal silica can be derived from colloidal silica (sol) containing 10 to 50 wt % of $SiO_2$ as an active ingredient or composite oxide fine particles containing $SiO_2$ and having a particle diameter of 1 to 100 nm.

The composite oxide is a composite of $SiO_2$ and a metal oxide. The metal oxide is an oxide of one or more metals selected from the group consisting of Al, Sn, Sb, Ta, Ce, La, Fe, Zn, W, Zr, In and Ti. Illustrative examples of the metal oxide include $Al_2O_3$, $SnO_2$, $Sb_2O_5$, $Ta_2O_5$, $CeO_2$, $La_2O_3$, $Fe_2O_3$, ZnO, $WO_3$, $ZrO_2$, $In_2O_3$ and $TiO_2$.

To enhance its dispersibility in a solvent, the above composite oxide may be surface modified by an organic silane compound. The amount of the organic silane compound is preferably 20 wt % or less based on the weight of the composite oxide fine particles.

The surface modification may be carried out while the organic silane compound has a hydrolyzable group or after hydrolysis.

The organic silane compound is a monofunctional silane represented by the following formula:

$$R_3SiX$$

wherein R is an organic group having an alkyl group, phenyl group, vinyl group, methacryloxy group, mercapto group, amino group or epoxy group, and X is a hydrolyzable group, a bifunctional silane represented by the following formula:

$$R_2SiX_2$$

wherein R and X are as defined hereinabove, a trifunctional silane represented by the following formula:

$$RSiX_3$$

wherein R and X are as defined hereinabove, or a tetrafunctional silane represented by the following formula:

$$SiX_4$$

wherein X is as defined hereinabove.

Examples of the above monofunctional silane include trimethylmethoxysilane, triethylmethoxysilane, trimethylethoxysilane, triethylethoxysilane, triphenylmethoxysilane, diphenylmethylmethoxysilane, phenyldimethylmethoxysilane, phenyldimethylethoxysilane, vinyldimethylmethoxysilane, vinyldimethylethoxysilane, γ-acryloxypropyldimethylmethoxysilane, γ-methacryloxypropyldimethylmethoxysilane, γ-mercaptopropyldimethylmethoxysilane, γ-mercaptopropyldimethylethoxysilane, N-β(aminoethyl) γ-aminopropyldimethylmethoxysilane, γ-aminopropyldimethylmethoxysilane, γ-aminopropyldimethylethoxysilane, γ-glycidoxypropyldimethylmethoxysilane, γ-glycidoxypropyldimethoxylethoxysilane and β-(3,4-epoxycyclohexyl)ethyldimethylmethoxysilane.

Examples of the bifunctional silane include dimethyldimethoxysilane, diethyldimethoxysilane, dimethyldiethoxysilane, diethyldiethoxysilane, diphenyldimethoxysilane, phenylmethyldimethoxysilane, phenylmethyldiethoxysilane, vinylmethyldimethoxysilane, vinylmethyldiethoxysilane, γ-acryloxypropylmethyldimethoxysilane, γ-methacryloxypropyldimethyldimethoxysilane, γ-mercaptopropylmethyldimethoxysilane, γ-mercaptopropylmethyldiethoxysilane, N-β(aminoethyl) γ-aminopropylmethyldimethoxysilane, γ-aminopropylmethyldimethoxysilane, γ-aminopropylmethyldiethoxysilane, γ-glycidoxypropylmethyldimethoxysilane, γ-glycidoxypropylmethoxydiethoxysilane and β-(3,4-epoxycyclohexyl)ethylmethyldimethoxysilane.

Examples of the trifunctional silane include methyltrimethoxysilane, ethyltrimethoxysilane, methyltriethoxysilane, ethyltriethoxysilane, phenyltrimethoxysilane, phenyltriethoxysilane, vinyltrimethoxysilane, vinyltriethoxysilane, vinyl(β-methoxyethoxy)silane, γ-acryloxypropyltrimethoxysilane, γ-methacryloxypropyltrimethoxysilane, γ-mercaptopropyltrimethoxysilane, γ-mercaptopropyltriethoxysilane, N-β(aminoethyl) γ-aminopropyltrimethoxysilane, γ-aminopropyltrimethoxysilane, γ-aminopropyltriethoxysilane, γ-glycidoxypropyltrimethoxysilane, β-glycidoxypropyltrimethoxysilane, γ-glycidoxypropyltriethoxysilane, β-glycidoxypropyltriethoxysilane and β-(3,4-epoxycyclohexyl)ethyltrimethoxysilane.

Further, examples of the tetrafunctional silane include tetraethylorthosilicate and tetramethylorthosilicate.

The composite oxide is treated with a silane compound preferably in water, alcohol or other organic medium.

Examples of the alcohol include saturated aliphatic alcohols such as methanol, ethanol, isopropyl alcohol, n-butanol and 2-butanol; cellosolves such as methyl cellosolve, ethyl cellosolve, propyl cellosolve and butyl cellosolve; propylene glycol derivatives such as propylene glycol monomethyl ether, propylene glycol monoethyl ether and propylene glycol monomethyl acetate; esters such as methyl acetate, ethyl acetate and butyl acetate; ethers such as diethyl ether and methyl isobutyl ether; ketones such as acetone and methylisobutyl ketone; aromatic hydrocarbons such as xylene and toluene; ethylene glycol, tetrahydrofuran, N,N-dimethylformamide and dichloroethane.

The other active ingredients of the hard coat composition are a compound represented by the above formula (1) and a compound represented by the above formula (2).

Examples of the compound represented by the above formula (1) include trimethylmethoxysilane, triethylmethoxysilane, trimethylethoxysilane, triethylethoxysilane, triphenylmethoxysilane, diphenylmethylmethoxysilane phenyldimethylmethoxysilane, phenyldimethylethoxysilane, vinyldimethylmethoxysilane, vinyldimethylethoxysilane, γ-acryloxypropyldimethylmethoxysilane, γ-methacryloxypropyldimethylmethoxysilane, γ-mercaptopropyldimethylmethoxysilane, γ-mercaptopropyldimethylethoxysilane, N-β(aminoethyl)γ-aminopropyldimethylmethoxysilane, γ-aminopropyldimethylmethoxysilane, γ-aminopropyldimethylethoxysilane, γ-glycidoxypropyldimethylmethoxysilane, γ-glycidoxypropyldimethoxyethoxysilane, β-(3,4-epoxycyclohexyl)ethyldimethylmethoxysilane, dimethyldimethoxysilane, diethyldimethoxysilane, dimethyldiethoxysilane, diethyldiethoxysilane, diphenyldimethoxysilane, phenylmethyldimethoxysilane, phenylmethyldiethoxysilane, vinylmethyldimethoxysilane, vinylmethyldiethoxysilane, γ-acryloxypropylmethyldimethoxysilane, γ-methacryloxypropyldimethyldimethoxysilane, γ-mercaptopropylmethyldimethoxysilane, γ-mercaptopropylmethyldiethoxysilane, N-β(aminoethyl) γ-aminopropylmethyldimethoxysilane, γ-aminopropylmethyldimethoxysilane, γ-aminopropylmethyldiethoxysilane, γ-glycidoxypropylmethyldimethoxysilane, γ-glycidoxypropylmethoxydiethoxysilane, β-(3,4-epoxycyclohexyl)ethylmethyldimethoxysilane, methyltrimethoxysilane, ethyltrimethoxysilane, methyltriethoxysilane, ethyltriethoxysilane, phenyltrimethoxysilane, phenyltriethoxysilane, vinyltrimethoxysialne, vinyltriethoxysilane, vinyl(β-methoxyethoxy)silane, γ-acryloxypropyltrimethoxysilane, γ-methacryloxypropyltrimethoxysilane, γ-mercaptopropyltrimethoxysilane, γ-mercaptopropyltriethoxysilane, N-β(aminoethyl) γ-aminopropyltrimethoxysilane, γ-aminopropyltrimethoxysilane, γ-aminopropyltriethoxysilane, γ-glycidoxypropyltrimethoxysilane, β-glycidoxypropyltrimethoxysilane, γ-glycidoxypropyltriethoxysilane, β-glycidoxypropyltriethoxysilane, β-(3,4-epoxycyclohexyl)ethyltrimethoxysilane, tetraethylorthosilicate and tetramethylorthosilicate. They may be used alone or in combination of two or more.

Examples of the compound represented by the above formula (2) include 3,3,3-trifluoropropyltrimethoxysilane, 3,3,3-trifluoropropyltriethoxysilane, (tridecafluoro-1,1,2,2-tetrahydrooctyl)trimethoxysilane, (tridecafluoro-1,1,2,2-tetrahydrooctyl)triethoxysilane, (heptadecafluoro-1,1,2,2-tetrahydrodecyl) trimethoxysilane, (heptadecafluoro-1,1,2,2-tetrahydrodecyl)triethoxysilane, (3,3,3-trifluoropropyl) methyldimethoxysilane, (3,3,3-trifluoropropyl) methyldiethoxysilane, (tridecafluoro-1,1,2,2-tetrahydrooctyl) methyldimethoxysilane, (tridecafluoro-1,1,2,2-tetrahydrooctyl) methyldiethoxysilane, (heptadecafluoro-1,1,2,2-tetrahydrodecyl) methyldimethoxysilane and (heptadecafluoro-1,1,2,2-tetrahydrodecyl) methyldiethoxysilane.

They may be used alone or in combination of two or more.

The first hard coat composition is preferably prepared as a dispersion by dispersing predetermined amounts of the above active ingredients in a liquid medium.

The compound represented by the above formula (1) is preferably used in an amount of 36 to 64 mol % based on the total number of mols of the compound and colloidal silica.

The compound represented by the above formula (2) is preferably used in an amount of 0.1 to 5.0 mol % based on the total number of mols of it and the compound represented by the above formula (1).

Examples of the above liquid medium include glycols such as ethylene glycol monomethyl ether acetate, ethylene glycol monoethyl ether acetate, ethylene glycol monopropyl ether acetate, ethylene glycol monobutyl ether acetate, propylene glycol monomethyl ether acetate, propylene glycol monoethyl ether acetate, propylene glycol monopropyl ether acetate, propylene glycol monobutyl ether acetate, ethylene glycol dimethyl ether, ethylene glycol diethyl ether, ethylene glycol dipropyl ether, ethylene glycol dibutyl ether, diethylene glycol dimethyl ether, diethylene glycol diethyl ether, diethylene glycol dipropyl ether, diethylene glycol dibutyl ether, propylene glycol dimethyl ether, propylene glycol diethyl ether, propylene glycol monomethyl ether, ethylene glycol monoethyl ether and ethylene glycol monobuty ether; alicyclic ketones such as cyclohexanone, o-methylcyclohexanone, m-methylcyclohexanone and p-methylcyclohexanone; acetic acid esters such as ethyl acetate, n-propyl acetate and n-butyl acetate; and alcohols such as methanol, ethanol, 1-propanol and 2-propanol.

The above dispersion generally contains a curing catalyst for the hard coat layer. The curing catalyst is selected from an alkali metal salt or ammonium salt of carboxylic acid, metal salt or ammonium salt of acetylacetone, metal salt of ethyl acetoacetate, metal salt coordinately bonded by acetylacetone or ethyl acetoacetate, primary, secondary or tertiary amine, polyalkyleneamine, sulfonic acid salt, magnesium perchlorate and ammonium perchlorate. These compounds may be used in combination with an organic mercaptan or mercaptoalkylenesilane.

Examples of the above metal salt include chelate compounds containing the following center metal and salts of a fatty acid. Examples of the center metal include Al, Zr, Co, Zn, Sn, Mn, V, Cu, Ce, Cr, Ru, Ga, Cd and Fe, the chelate compounds include acetylacetone, di-n-butoxide-mono-ethyl acetate, di-n-butoxide-mono-methyl acetate, methyl ethyl ketoxime, 2,4-hexanedione, 3,5-heptanedione and acetoxime, and examples of the fatty acid include 2-ethylhexylic acid, stearic acid, lauric acid, oleic acid, acetic acid, sebasic acid, dodecanoic diacid, propionic acid, brassylic acid, isobutyric acid and citraconic acid.

Preferred examples of the primary, secondary or tertiary amine include aliphatic amines, aromatic amines and aminosilanes such as polymethylenediamine, polyether diamine, diethylenetriamine, iminobispropylamine, bishexamethylenetriamine, diethylenetriamine, tetraethylenepentamine, pentaethylenehexamine, pentaethylenehexamine, dimethylaminopropylamine, aminoethylethanolamine, methyliminobispropylamine, menthanediamine, N-aminomethylpiperazine, 1,3-diaminocyclohexane, isophoronediamine, metaxylenediamine, tetrachloroparaxylenediamine, methaphenilenediamine, 4,4'-methylenedianiline, diaminodiphenylsulfone, benzidine, toluidine, diaminodiphenyl ether, 4,4'-thiodianiline, 4,4'-bis(o-toluidine) dianisidine, o-phenylenediamine, 2,4-toluenediamine, methylenebis(o-chloroaniline), diaminiditolyl sulfone, bis (3,4-diaminophenyl)sulfone, 2,6-diaminopyridine, 4-chloro-o-phenylenediamine, 4-methoxy-6-methyl-m-phenylenediamine, m-aminobenzylamine, N,N,N',N'-tetramethyl-1,3-butanediamine, N,N,N',N'-tetramethyl-p-phenylenediamine, tetramethylguanidine, triethanolamine, 2-dimethylamino-2-hydroxypropane, N,N'-dimethylpiperazine, N,N'-bis[(2-hydroxy)propyl] piperazine, N-methylmorpholine, hexamethylenetetramine, pyridine, pyrazine, quinoline, benzyldimethylamine, α-methylbenzylmethylamine, 2-(dimethylaminomethyl) phenol, 2,4,6-tris(dimethylaminomethylol)phenol, N-methylpiperazine, pyrrolidine, morpholine, N-β (aminoethyl)γ-aminopropyltrimethoxysilane, γ-aminopropyltrimethoxysilane, γ-aminopropyltriethoxysilane, N-β(aminoethyl)γ-aminopropylmethyldimethoxysilane, γ-aminopropylmethyldimethoxysilane and γ-aminopropylmethyldiethoxysilane.

The above curing catalyst may be added during the preparation of a dispersion or right before application. The amount of the curing catalyst is preferably 0.001 to 10 wt % based on the effective solid content of the dispersion.

The above dispersion may contain a leveling agent or lubricity providing agent for a cured coating film as an optional component. Examples of the agent include a copolymer of polyoxyalkylene and polydimethylsiloxane (Paint Additive 31 of Dow Corning Co., Ltd.) and a copolymer of polyoxyalkylene and fluorocarbon. The agent is preferably used in an amount of 0.001 to 10 wt % based on the total weight of the solution.

Other optional components include an antioxidant, weatherability providing agent, antistatic agent and bluing agent.

The above dispersion is preferably prepared to ensure that its solids content is 2 to 50 wt %.

A description is subsequently given of the second hard coat composition of the present invention. The second hard coat composition corresponds to the above first hard coat composition which further comprises a compound represented by the above formula (3).

Preferred examples of the compound represented by the above formula (3) include 2-hydroxy-4-(3-triethoxysilyl-propoxy)diphenyl ketone and 2-hydroxy-4-(3-trimethoxysilyl-propoxy)diphenyl ketone.

The compound represented by the above formula (3) is preferably used in an amount of 0.1 to 15 mol % based on the total number of mols of it and the compound represented by the above formula (1).

As for what is not described of the second hard coat composition herein, it should be understood that the above description of the first hard coat composition is applied directly or with modifications obvious to one of ordinary skill in the art.

The first product of the present invention will be described hereinbelow.

The first product is obtained by applying the first hard coat composition to a resin substrate through a primer.

The primer layer preferably comprises an organic resin and an ultraviolet light absorber in an amount of 5 wt % or more based on the total of effective nonvolatile components.

The organic resin is a resin which can adhere to a resin substrate, for example, a polycarbonate board and to a silicon hard coat. The organic resin is known and preferably an acrylic polymer, a copolymer of acrylic monomer and methacryloxysilane or a copolymer of a methacrylic monomer and an acrylic monomer having a benzotriazole group or benzophenone group. Out of these, an acrylic polymer and a copolymer of acrylic monomer and methacryloxysilane is more preferred. These organic resins may be used alone or in combination of two or more.

Preferred examples of the ultraviolet light absorber contained in the primer layer include benzotriazole-based and benzophenone-based ultraviolet light absorbers. Out of these, benzophenone-based ultraviolet light absorbers are more preferred. The above ultraviolet light absorbers may be used alone or in combination of two or more.

The benzotriazole-based ultraviolet light absorbers include 2-(2'-hydroxy-5'-methylphenyl)-benzotriazole, 2-(2'-hydroxy-3',5'-di-t-butylphenyl)-benzotriazole, 2-(2'-hydroxy-5'-t-butylphenyl)-benzotriazole, 2-(2'-hydroxy-5'-t-octylphenyl)-benzotriazole, 2-(2'-hydroxy-3',5'-di-t-butylphenyl)-5-chloro-benzotriazole, Tinubin 328, Tinubin 384, Tinubin 900, Tinubin 928 and Tinubin 1130 of Ciba Specialty Chemicals Co., Ltd.

The benzophenone-based ultraviolet light absorbers include 2,4-dihydroxybenzophenone, 2-hydroxy-4-methoxybenzophenone, 2,2'-hydroxy-4-methoxybenzophenone, 2,2',4,4'-tetrahydroxybenzophenone and 2,2'-dihydroxy-4,4'-dimethoxybenzophenone.

Other ultraviolet light absorbers such as silane compounds having a benzotriazole or benzophenone group may also be used.

The ultraviolet light absorber is contained in an amount of 5 wt % or more, preferably 5 to 60 wt %, more preferably 10 to 50 wt % based on the total of effective nonvolatile components contained in the primer layer.

The primer layer is formed by applying a solvent solution containing predetermined amounts of an ultraviolet light absorber and an organic resin to a resin substrate, removing the solvent and curing by heating.

Examples of the solvent include glycols such as ethylene glycol monomethyl ether acetate, ethylene glycol monoethyl ether acetate, ethylene glycol monopropyl ether acetate, ethylene glycol monobutyl ether acetate, propylene glycol monomethyl ether acetate, propylene glycol monoethyl ether acetate, propylene glycol monopropyl ether acetate, propylene glycol monobutyl ether acetate, ethylene glycol dimethyl ether, ethylene glycol diethyl ether, ethylene glycol dipropyl ether, ethylene glycol dibutyl ether, diethylene glycol dimethyl ether, diethylene glycol diethyl ether, diethylene glycol dipropyl ether, diethylene glycol dibutyl ether, propylene glycol dimethyl ether, propylene glycol diethyl ether, propylene glycol monomethyl ether, ethylene glycol monoethyl ether and ethylene glycol monobutyl ether; alicyclic ketones such as cyclohexanone, o-methylcyclohexanone, m-methylcyclohexanone and p-methylcyclohexanone; acetic acid esters such as ethyl acetate, n-propyl acetate and n-butyl acetate; alcohols such as methanol, ethanol, 1-propanol and 2-propanol: and solvent naphtha and methyl ethyl ketone.

The above solvent solution may contain a leveling agent and lubricity providing agent for a cured coating film as optional components. Examples of the agent include a copolymer of polyoxyalkylene and polydimethylsiloxane (Paint Additive 31 of Dow Corning Co., Ltd.) and a copolymer of polyoxyalkylene and fluorocarbon. The agent is preferably used in an amount of 0.001 to 10 wt % of the total weight of the solution.

Other optional components include an antioxidant, weatherability modifier, antistatic agent and bluing agent.

The above solvent solution is preferably prepared to a solids content of 2 to 50 wt %.

The above solvent solution may be applied by dip coating, flow coating, spinner coating or spray coating.

The application is preferably carried out to ensure that the thickness of the cured coating film becomes 1 to 10 µm. When the thickness of the cured coating film is smaller than 1 µm, yellowing resistance and weatherability may become unsatisfactory and when the thickness is larger than 10 µm, hardness after hard coating may be apt to lower.

After application, the coating film of the solution is heated at 15 to 120° C. for 5 minutes to several hours to provide a primer layer.

The application of the first hard coat composition to the primer layer may be carried out by dip coating, flow coating, spinner coating or spray coating. After application, the liquid medium is removed and the coating film is cured by heating.

The application is preferably carried out to ensure that the thickness of the coating film after curing becomes 2 to 7 µm. When the thickness of the coating film is smaller than 2 µm, the hardness of the film becomes unsatisfactory and when the thickness is larger than 7 µm, the hard coat layer may be apt to crack.

After application, the coating film of the dispersion is heated at 100 to 130° C. for 1 to 24 hours to provide a silicon hard coat layer.

The second product of the present invention is obtained by applying the second hard coat composition of the present invention to a resin substrate. Since the second hard coat composition contains a silicon compound having an ultraviolet light absorbing organic group as described above, it provides a hard coat layer having excellent weatherability without using a primer containing an ultraviolet light absorber. The second hard coat composition can be applied to the resin substrate in the same manner as the first product.

The first product and the second product of the present invention may be used in sound-proof walls, grazing applications and indoor applications.

As described above, according to the present invention, there can be provided a resin substrate having a hard coat which can retain water-repellency even when it is used in the open air and prevent the adhesion of a stain while it keeps its abrasion resistance for a long time.

EXAMPLES

The following examples are provided to further illustrate the present invention. Substances used in the examples are as follows.

Polycarbonate board: board of Panlite PC1111 (Teijin Chemicals, Ltd.) having a thickness of 4 mm.

Primer 1: solution containing 100 g of a copolymer of methyl methacrylate and methacryloxypropyltrimethoxysilane in a molar ratio of 4:1 (Mn=10,000, Mw=40,000), 50 g of 2,4-dihydroxybenzophenone, 850 g of propylene glycol monomethyl ether and 0.1 g of Paint Additive 31 of Dow Corning Co., Ltd.

Primer 2: solution containing 60 g of Paralloid A-11 (acrylic resin of Rhom and Harse Co., Ltd.), 30 g of 2,4-dihydroxybenzophenone, 905 g of propylene glycol monomethyl ether, 5 g of toluene and 0.1 g of Paint Additive 19 of Dow Corning Co., Ltd.

Hard coat 1: solution obtained by reacting 58 g of Snowtex O-40 (colloidal silica having a nonvolatile content of 40% of Nissan Chemical Industries, Ltd.), 86 g of methyltrimethoxysilane and 4.3 g of perfluorooctylethyltrimethoxysilane and adding 505 g of isopropyl alcohol, 140 g of normal butanol, 18 g of acetic acid, 2 g of sodium acetate and 0.1 g of Paint Additive 19 of Dow Corning Co., Ltd. to the above reaction product Hard coat 2: solution obtained by reacting 130 g of Snowtex O-40 (colloidal silica having a nonvolatile content of 40% of Nissan Chemical Industries, Ltd.), 160 g of methyltrimethoxysilane, 12 g of trimethylmethoxysilane and 9 g of perfluorooctylethyltrimethoxysilane and adding 525 g of isopropyl alcohol, 145 g of normal butanol, 18 g of acetic acid, 1 g of sodium acetate and 0.2 g of Paint Additive 19 of Dow Corning Co., Ltd. to the reaction product Hard coat 3: solution obtained by reacting 137 g of Snowtex O-40 (colloidal silica having a nonvolatile content of 40% of Nissan Chemical Industries, Ltd.), 166 g of methyltrimethoxysilane, 22 g of 2-hydroxy-4-(3-triethoxysilyl-propoxy)-diphenyl ketone and 11 g of perfluorooctylethyltriethoxysilane and adding 505 g of isopropyl alcohol, 140 g of normal butanol, 18 g of acetic acid, 1 g of sodium acetate and 0.1 g of Paint Additive 19 of Dow Corning Co., Ltd. to the reaction product Hard coat 4: solution obtained by reacting 150 g of Snowtex O-40 (colloidal silica having a nonvolatile content of 40% of Nissan Chemical Industries, Ltd.) and 183 g of methyltrimethoxysilane and adding 508 g of isopropyl alcohol, 140 g of normal butanol, 18 g of acetic acid, 1 g of sodium acetate and 0.1 g of Paint Additive 19 of Dow Corning Co., Ltd. to the reaction product Conditions such as a coating technique and test methods used in the examples are given below.

Coating technique: flow coating or dip coating

Primer curing conditions: 110° C. for 30 minutes (primer 1) or 30° C. for 15 minutes (primer 2)

Hard coat curing conditions: 120° C. for 60 minutes

Adhesion: JIS K5400-based cross-cut adhesion test

Abrasion resistance: haze before and after 500 revolutions under a load of 500 g in a JIS K7204-based Taber abrasion test Contact angle: contact angle with 0.1 cc of water drop is measured Weatherability: appearance, adhesion, abrasion resistance and contact angle after 3,000 hours are evaluated using a sunshine carbon arc weatherometer (black panel temperature of 63° C., water sprayed for 12 minutes per 1 hour)

Example 1

Primer 1 was applied to a polycarbonate board by flow coating and cured (thickness of the primer layer after curing was 1.8 to 3.5 μm), and then hard coat 1 was applied to the obtained primer layer by flow coating and cured (thickness of the hard coat layer after curing was 2 to 5 μm).

Example 2

The procedure of Example 1 was repeated except that hard coat 2 was used in place of hard coat 1.

Example 3

The procedure of Example 1 was repeated except that hard coat 3 was used in place of hard coat 1.

Example 4

The procedure of Example 1 was repeated except that primer 2 was used in place of primer 1.

Example 5

The procedure of Example 2 was repeated except that primer 2 was used in place of primer 1.

Example 6

The procedure of Example 3 was repeated except that primer 3 was used in place of primer 1.

Comparative Example 1

The procedure of Example 1 was repeated except that hard coat 4 was used in place of hard coat 1.

The properties of the products obtained in the above Examples 1 to 6 and Comparative Example 1 are shown in Table 1 (initial state) and Table 2 (properties after a weatherability test).

TABLE 1

| Sample | adhesion (%) | haze | contact angle (°) |
|---|---|---|---|
| Ex. 1 | 100 | 7 | 103 |
| Ex. 2 | 100 | 8 | 101 |
| Ex. 3 | 100 | 9 | 99 |
| Ex. 4 | 100 | 12 | 100 |
| Ex. 5 | 100 | 10 | 101 |
| Ex. 6 | 100 | 13 | 103 |
| C. Ex. 1 | 100 | 14 | 87 |

Ex.: Example   C. Ex.: Comparative Example

TABLE 2

| Sample | adhesion (%) | haze | contact angle (°) |
|---|---|---|---|
| Ex. 1 | 100 | 8 | 97 |
| Ex. 2 | 100 | 8 | 95 |
| Ex. 3 | 100 | 10 | 93 |
| Ex. 4 | 100 | 12 | 97 |
| Ex. 5 | 100 | 11 | 96 |
| Ex. 6 | 100 | 13 | 97 |
| C. Ex. 1 | 100 | 15 | 74 |

Ex.: Example   C. Ex.: Comparative Example

What is claimed is:

1. A hard composition comprising:

colloidal silica, a compound represented by the following formula (1):

$$R^1{}_a R^2{}_b Si(OR^3)_{4-a-b} \quad (1)$$

wherein $R^1$ is an alkyl group having 1 to 4 carbon atoms, chloroalkyl group having 1 to 4 carbon atoms, aryl group having 6 to 12 carbon atoms, haloaryl group having 6 to 12 carbon atoms, methacryloxyalkyl group having 5 to 8 carbon atoms, ureidoalkylene group having 2 to 10 carbon atoms, aromatic ureidoalkylene group having 8 to 24 carbon atoms, aromatic alkylene group having 8 to 24 carbon atoms or mercaptoalkylene group having 1 to 12 carbon atoms, $R^2$ is an alkyl group having 1 to 6 carbon atoms, aryl group having 6 to 12 carbon atoms, alkenyl group having 2 to 10 carbon atoms, chloroalkyl group having 1 to 4 carbon atoms or haloaryl group having 6 to 12 carbon atoms, $R^3$ is a hydrogen atom, alkyl group having 1 to 4 carbon atoms, acyl group having 1 to 6 carbon atoms or alkylacyl group having 3 to 12 carbon atoms, a is 1, 2 or 3, and b is 0, 1 or 2, with the proviso that (a+b) is 1, 2 or 3;

a compound represented by the following formula (2):

$$R^4{}_cR^5{}_dSi(OR^6)_{4-c-d} \qquad (2)$$

wherein $R^4$ is a fluoroalkyl group having 1 to 12 carbon atoms, $R^5$ is an alkyl group having 1 to 6 carbon atoms, aryl group having 6 to 12 carbon atoms, alkenyl group having 2 to 10 carbon atoms, haloalkyl group having 1 to 6 carbon atoms or haloaryl group having 6 to 12 carbon atoms, $R^6$ is a hydrogen atom, alkyl group having 1 to 4 carbon atoms, acyl group having 1 to 6 carbon atoms or alkylacyl group having 3 to 12 carbon atoms, c is 1, 2 or 3, and d is 0, 1 or 2, with the proviso that (c+d) is 1, 2 or 3, and a compound represented by the following formula (3):

$$R^7-X_g-R^8{}_h-Si(OR^9)_3 \qquad (3)$$

wherein $R^7$ is an ultraviolet light absorbing organic group having a hydroxy group, $R^8$ is an alkyl group having 1 to 4 carbon atoms or acyl group having 1 to 6 carbon atoms, $R^9$ is a hydrogen atom, alkyl group having 1 to 4 carbon atoms or acyl group having 1 to 6 carbon atoms, X is an ether bond, ester bond or urethane bond, g is 0 or 1, and h is 0 or 1.

2. A resin product comprising a resin substrate, a primer layer and a hard coat layer in the mentioned order, wherein the primer layer contains an ultraviolet light absorber in an amount of 5 wt % or more based on the total of effective nonvolatile components, and the hard coat layer is made from a hard coat composition comprising:

colloidal silica;

a compound represented by the following formula (1):

$$R^1{}_aR^2{}_bSi(OR^3)_{4-a-b} \qquad (1)$$

wherein $R^1$ is an alkyl group having 1 to 4 carbon atoms, $R^2$ is an alkyl group having 1 to 6 carbon atoms, aryl group having 6 to 12 carbon atoms, alkenyl group having 2 to 10 carbon atoms, chloroalkyl group having 1 to 4 carbon atoms or haloaryl group having 6 to 12 carbon atoms, $R^3$ is a hydrogen atom, alkyl group having 1 to 4 carbon atoms, acyl group having 1 to 6 carbon atoms or alkylacyl group having 3 to 12 carbon atoms, a is 1, and b is 0; and a compound represented by the following formula (2):

$$R^4{}_cR^5{}_dSi(OR^6)_{4-c-d} \qquad (2)$$

wherein $R^4$ is a fluoroalkyl group having 1 to 12 carbon atoms, $R^5$ is an alkyl group having 1 to 6 carbon atoms, aryl group having 6 to 12 carbon atoms, alkenyl group having 2 to 10 carbon atoms, haloalkyl group having 1 to 6 carbon atoms or haloaryl group having 6 to 12 carbon atoms, $R^6$ is a hydrogen atom, alkyl group having 1 to 4 carbon atoms, acyl group having 1 to 6 carbon atoms or alkylacyl group having 3 to 12 carbon atoms, c is 1, 2 or 3, and d is 0, 1 or 2, with the proviso that (c+d) is 1, 2 or 3.

3. The resin product of claim 2, wherein the primer layer has a thickness of 0.1 to 15 μm.

4. A resin product comprising a resin substrate and a hard coat layer made from the hard coat composition of claim 1.

5. A method of forming a hard coat layer on a resin substrate with a primer layer therebetween, which comprises applying a hard coat composition to a primer layer on a resin substrate, wherein the primer layer contains an ultraviolet light absorber in an amount of 5 wt % or more based on the total of effective nonvolatile components, and the hard coat composition comprises:

colloidal silica;

a compound represented by the following formula (1):

$$R^1{}_aR^2{}_bSi(OR^3)_{4-a-b} \qquad (1)$$

wherein $R^1$ is an alkyl group having 1 to 4 carbon atoms, $R^2$ is an alkyl group having 1 to 6 carbon atoms, aryl group having 6 to 12 carbon atoms, alkenyl group having 2 to 10 carbon atoms, chloroalkyl group having 1 to 4 carbon atoms or haloaryl group having 6 to 12 carbon atoms, $R^3$ is a hydrogen atom, alkyl group having 1 to 4 carbon atoms, acyl group having 1 to 6 carbon atoms or alkylacyl group having 3 to 12 carbon atoms, a is 1, and b is 0; and a compound represented by the following formula (2):

$$R^4{}_cR^5{}_dSi(OR^6)_{4-c-d} \qquad (2)$$

wherein $R^4$ is a fluoroalkyl group having 1 to 12 carbon atoms, $R^5$ is an alkyl group having 1 to 6 carbon atoms, aryl group having 6 to 12 carbon atoms, alkenyl group having 2 to 10 carbon atoms, haloalkyl group having 1 to 6 carbon atoms or haloaryl group having 6 to 12 carbon atoms, $R^6$ is a hydrogen atom, alkyl group having 1 to 4 carbon atoms, acyl group having 1 to 6 carbon atoms or alkylacyl group having 3 to 12 carbon atoms, c is 1, 2 or 3, and d is 0, 1 or 2, with the proviso that (c+d) is 1, 2 or 3.

6. A method of directly forming a hard coat layer on a resin substrate, which comprises applying the hard coat composition of claim 1 on a resin substrate.

7. A resin product comprising a resin substrate, a primer layer and a hard coat layer made from a hard coat composition comprising:

colloidal silica;

a compound represented by the following formula (1)

$$R^1{}_aR^2{}_bSi(OR^3)_{4-a-b} \qquad (1)$$

wherein $R^1$ is an alkyl group having 1 to 4 carbon atoms, chloroalkyl group having 1 to 4 carbon atoms, aryl group having 6 to 12 carbon atoms, haloaryl group having 6 to 12 carbon atoms, methacryloxyalkyl group having 5 to 8 carbon atoms, ureidoalkylene group having 2 to 10 carbon atoms, aromatic ureidoalkylene group having 8 to 24 carbon atoms, aromatic alkylene group having 8 to 24 carbon atoms or mercaptoalkylene group having 1 to 12 carbon atoms, $R^2$ is an alkyl group having 1 to 6 carbon atoms, aryl group having 6 to 12 carbon atoms, alkenyl group having 2 to 10 carbon atoms, chloroalkyl group having 1 to 4 carbon atoms or haloaryl group having 6 to 12 carbon atoms, $R^3$ is a hydrogen atom, alkyl group having 1 to 4 carbon atoms, acyl group having 1 to 6 carbon atoms or alkylacyl group having 3 to 12 carbon atoms, a is 1, 2 or 3, and b is 0, 1 or 2, with the proviso that (a+b) is 1, 2 or 3; and a compound represented by the following formula (2):

$$R^4{}_cR^5{}_dSi(OR^6)_{4-c-d} \qquad (2)$$

wherein $R^4$ is a fluoroalkyl group having 1 to 12 carbon atoms, $R^5$ is an alkyl group having 1 to 6 carbon atoms, aryl group having 6 to 12 carbon atoms, alkenyl group having 2 to 10 carbon atoms, haloalkyl group having 1 to 6 carbon atoms or haloaryl group having 6 to 12 carbon atoms, $R^6$ is a hydrogen atom, alkyl group having 1 to 4 carbon atoms, acyl group having 1 to 6 carbon atoms or alkylacyl group having 3 to 12 carbon atoms, c is 1, 2 or 3, and d is 0, 1 or 2, with the proviso that (c+d) is 1, 2 or 3; and wherein the primer layer contains an ultraviolet light absorber in an amount of 5 wt % or more based on the total of effective nonvolatile components.

* * * * *